Dec. 28, 1965   G. R. CALL   3,225,784
LOW PRESSURE WARNING DEVICE
Filed Feb. 25, 1963

INVENTOR:
George R. Call

United States Patent Office 3,225,784
Patented Dec. 28, 1965

3,225,784
LOW PRESSURE WARNING DEVICE
George R. Call, 20 McDonald Drive, Sioux City, Iowa
Filed Feb. 25, 1963, Ser. No. 260,539
1 Claim. (Cl. 137—234)

This invention relates to a low pressure warning device which can be adapted to the air inflated tire of a vehicle and so designed to be attached to the end of the conventional tire valve stem. The device is so constructed that a higher air pressure in the tire will hold the device in a closed position to prevent escaping of the air, as well as closing the outer opening of the device against the entrance of water or dirt, and yet to cause opening of the valve portions of the device when a pre-determined lower air pressure level has been reached, and whereupon when reaching this lower air pressure level, certain valve portions of the device will open and in conjunction with other members will cause a whistle or similar other warning sound so that the driver will be alerted to the fact that the pressure has dropped in the tire.

This provides an important feature to warn the driver so that he can slow down from higher speeds before the pressure becomes too low to provide dangerous conditions.

Also, I provide that feature in my invention wherein the valve arrangement in the device will remain in a closed air-tight condition and will remain in this condition by virtue of the higher air pressure from the air in the tube or tire itself.

A further objective of my invention is to provide means wherein the air escape valve on the outer shell of the device will open rapidly when the air pressure in the device has dropped to or below a pre-determined pressure point, and will not open too slowly as it normally would do under a gradually and slowly falling tire air pressure.

Figure 1:
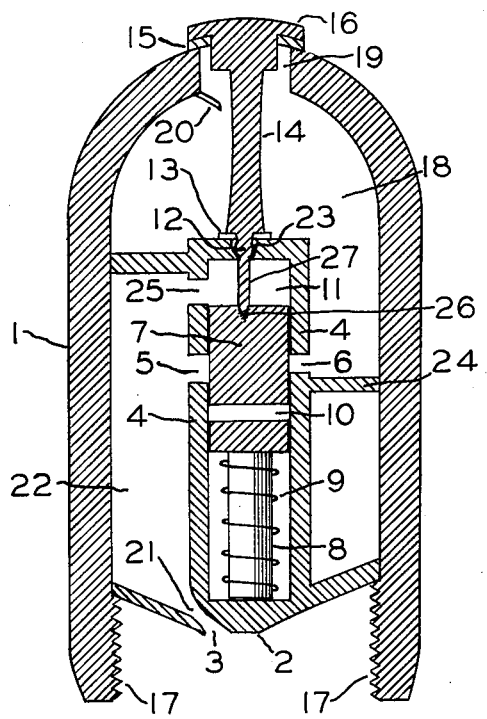
Figure 2:
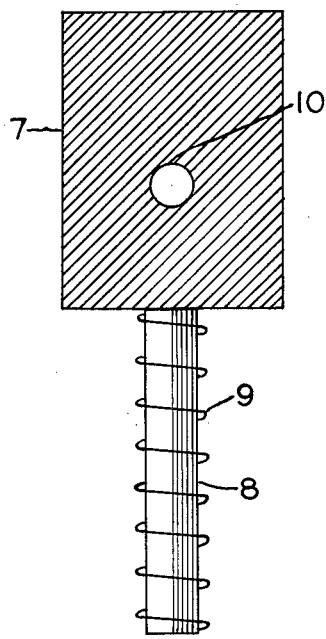
Figure 3:
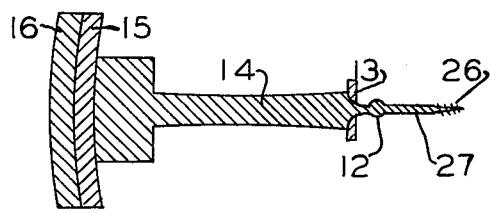

In now describing my invention, FIGURE 1 is an elevation in cross section of my invention, FIGURE 2 is a detailed sectional view of the piston only with its attached piston rod and helical spring, and FIGURE 3 is a detailed sectional view of one of the valve members.

Referring to FIGURE 1, the character 1 indicates a casing which is preferably of tubular shape, this casing including the inner threads at 17, these threads being adapted to be threadably engaged with a conventional valve stem used on standard pneumatic tubes or tires.

The character 2 indicates a suitable base portion projecting downwardly as shown so that it will depress the tire valve stem when the threaded portion 17 is tightly engaged with the threads of the valve, and the character 4 indicates a piston chamber suitably braced within the casing 1 as shown by suitable partitions, as will be described, these partitions dividing the interior of the shell 1 into an intake cavity 22 and an outlet cavity 18, the character 24 indicating a brace member. The base 2 also includes an opening 3 which permits the escaping air from the tire to pass from the valve in the tire into the opening 21 and then into the cavity 22.

It will be noted that during normal conditions, or when the pressure in the tire is normal, the pressure of the air in the passage 25 which will enter from the cavity 22 will cause the piston 7 to be in the approximate position shown in FIGURE 1, the piston 7 being substantially square in cross-section, this piston being held against the spring pressure of the helical spring 9, the character 8 indicating a stem received in the spring 9. The characters 5 and 6 indicate passageways provided in the chamber 4, and the character 10 indicates a transverse further passageway passing through the piston 7. It will be noted that the spring 9 is supported by the base member 2, and the character 18 indicates a further open portion of the valve structure, the character 16 indicating an outer cap bearing against the gasket 15 adapted to seal the opening 19 of the casing 1.

The character 14 indicates a stem portion extending from the member 16, the character 13 indicating a sealing washer or other similar member, the character 12 indicating a suitable spring-like ball member which can be made in any desired manner to snugly engage the spherical opening 23, and the character 27 indicates a stem portion extending from the ball 12 and which is threadably engaged as at 26 with the top of the piston 7.

The character 20 indicates a thin flat lip or similar member having a sharp edge, the top portion of the casing 1 having a shape more or less similar to a conventional whistle, whereby when a stream of air will impinge on the edge 20, a whistling sound will be provided which will be emitted out of the opening 19 and into the atmosphere under the low pressure conditions.

In now explaining the operation of the device, it will be noted that as explained heretofore when the pressure in the tire is normal, this higher pressure will cause the compressed air at 25 to hold the piston 7 downwardly. However, when the pressure in the tire drops below a pre-determined level, this lower pressure will cause the spring 9 to force the piston 7 outwardly with respect to the tire, the compression strength of the spring 9 having been pre-determined and pre-set for this purpose. This will then cause the passageway 10 to communicate with the passageways 5 and 6 whereupon the air will then pass from the cavity 22 through these passageways and upwardly toward the opening 19 and through this opening, since the opening will now be unsealed. As the air impinges upon the member 20, the whistling sound will be provided to thereby warn the driver, so that the necessary correction can be made.

The spring arrangement at the ball 12, etc. is so adjusted that the movement of the piston 7 as explained will be quickly effected under the above described conditions to thereby provide a quick, and instantaneous opening of the member 16, instead of an undesired gradual opening of the same.

The arrangement can be re-set whenever desired by merely manually pressing the member 16 inwardly toward the tire after the installation of the device, to provide for the passage of the compressed air through the opening 25 and to thereby force the piston 7 to the position shown in FIGURE 1.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A low pressure warning device for use with a vehicle pneumatic tire, comprising a casing, means for attaching said casing to the outer end of a valve stem on a pneumatic tire, said casing including a first abutment portion closing the lower portion of said casing and adapted to actuate the valve of a valve stem, a piston chamber, a piston sealingly and slidably engaged in said piston chamber, said piston chamber having aligned openings, said piston having a transverse opening adapted to be aligned with said chamber openings, said piston chamber including a lower abutment portion, a spring bearing against said lower abutment portion and said piston, said first abutment portion having an opening therethrough, said piston chamber having an opening at its upper end, said casing having an end opening, a stem attached to said piston, said stem extending through said opening and including a sealing portion externally of said casing for abutment with said end opening, a whistle causing member within said casing attached adjacently to said opening whereby air impinging thereagainst will cause a warning sound, said opening in the upper end of said piston chamber being in communication with a portion of said casing exteriorly of said piston chamber, decrease of pressure to a pre-determined value in said piston chamber causing said spring to force said piston outwardly to cause alignment of said piston transverse opening and said aligned chamber openings, and to release said sealing portion from said end opening whereby air passing through said piston transverse opening and said aligned chamber openings will cause air impingement against said whistle causing member.

References Cited by the Examiner

UNITED STATES PATENTS

| | | | |
|---|---|---|---|
| 204,640 | 6/1878 | Wells | 251—282 X |
| 734,145 | 7/1903 | Swinney | 137—505.22 |
| 1,230,071 | 6/1917 | Hawk | 137—230 X |
| 1,459,586 | 6/1923 | Fitz. | |
| 1,769,508 | 7/1930 | Harned | 137—227 X |
| 3,174,500 | 3/1965 | Johnson et al. | 251—75 X |

ISADOR WEIL, *Primary Examiner.*

MARTIN P. SCHWADRON, *Examiner.*